United States Patent

Ikeyama et al.

[11] Patent Number: 6,166,855
[45] Date of Patent: Dec. 26, 2000

[54] ANTI-REFLECTION FILM AND DISPLAY DEVICE HAVING THE SAME

[75] Inventors: Akihiro Ikeyama; Ichiro Amimori; Tomokazu Yasuda, all of Minami-ashigara, Japan

[73] Assignee: Fuji Photo Film Co., Ltd., Minami-Ashigara, Japan

[21] Appl. No.: 09/326,551

[22] Filed: Jun. 7, 1999

[30] Foreign Application Priority Data

Jun. 5, 1998 [JP] Japan .................................. 10-173948

[51] Int. Cl.$^7$ ..................................... G02B 1/10
[52] U.S. Cl. ........................ 359/580; 359/582; 428/315.5
[58] Field of Search ..................... 359/580, 581, 359/582; 428/315.5

[56] References Cited

U.S. PATENT DOCUMENTS

| | | |
|---|---|---|
| 4,374,158 | 2/1983 | Taniguchi et al. . |
| 5,871,843 | 2/1999 | Yoneda et al. ........................ 428/315.5 |
| 5,919,155 | 7/1999 | Yasuda et al. ........................... 359/582 |
| 5,945,209 | 8/1999 | Okazaki et al. ........................ 428/304.4 |

FOREIGN PATENT DOCUMENTS

| | | |
|---|---|---|
| 0778476 | 6/1997 | European Pat. Off. . |
| 222502 | 8/1997 | Japan . |
| 9-222503 | 8/1997 | Japan . |
| 9-227713 | 9/1997 | Japan . |
| 9-288201 | 11/1997 | Japan . |
| 10-142402 | 5/1998 | Japan . |
| 10-142403 | 5/1998 | Japan . |
| 10-221506 | 8/1998 | Japan . |
| 10-282305 | 10/1998 | Japan . |

*Primary Examiner*—Cassandra Spyrou
*Assistant Examiner*—John Juba, Jr.
*Attorney, Agent, or Firm*—Burns, Doane, Swecker & Mathis, LLP

[57] ABSTRACT

An anti-reflection film includes a transparent support and a low refractive index layer. A refractive index of the low refractive index layer is lower than a refractive index of the transparent support. The low refractive index layer contains micro voids in an amount of 3 to 50 volume % of the low refractive index layer. The anti-reflection film further has an overcoating layer provided on the low refractive index layer. The overcoating layer contains a fluorine compound. The fluorine compound is not present in the micro voids, or an amount of the fluorine compound present in the micro voids is less than 70 volume % of the micro voids.

13 Claims, 2 Drawing Sheets

ANTI-REFLECTION FILM AND DISPLAY DEVICE HAVING THE SAME

FIELD OF THE INVENTION

The present invention relates to an anti-reflection film comprising a transparent support, a low refractive index layer and an overcoating layer in the order. The invention also relates to a display device provided with the anti-reflection film.

BACKGROUND OF THE INVENTION

Anti-reflection films are attached to various display devices, such as a liquid crystal display (LCD), a plasma display panel (PDP), an electroluminescence display (ELD) or a cathode ray tube (CRT).

Conventional anti-reflection films have two or more transparent layers made of metal oxides superposed one on another. The transparent layers are used to effectively lower reflection of light of wide wavelength region. The metal oxide transparent layer has been formed according to a chemical vacuum deposition (CVD) method or a physical vacuum deposition (PVD) method, particularly the PVD method. The metal oxide transparent layer has an excellent optical characteristic as an anti-reflection film. However, the deposition method is not suitable for mass production because the productivity of the method is low.

A coating method has recently been proposed in place of the deposition method. Optical functional layers are coated on a transparent support according to the coating method.

A low refractive index layer (having a refractive index lower than a refractive index of a transparent support) should be provided to obtain an anti-reflection film. In the case that two or more optical functional layers are provided on a transparent support, the low refractive index layer is arranged as the uppermost layer. The low refractive index can effectively be obtained by introducing voids into the low refractive index layer. A layer containing voids (i.e., air) has a low refractive index because the refractive index of the air is 1.00. Micro voids can be formed in the low refractive index layer by adding particles into the layer. The micro voids are present between the particles or contained in the particles.

Japanese Patent Publication No. 60(1985)-59250 discloses an anti-reflection layer having micro pores and inorganic particles. The anti-reflection layer is formed according to a coating method. After coating the layer, the layer is subjected to an activated gas treatment. The gas is emitted from the layer to form the micro pores.

Japanese Patent Provisional Publication No. 2(1990)-245702 discloses an anti-reflection film comprising two or more fine particles (such as $MgF_2$ and $SiO_2$) in which blending ratio of the particles is changed along a thickness direction. A refractive index is adjusted by the blending ratio to obtain an optical effect of an anti-reflection film having a high refractive index layer and a low refractive index layer. The fine particles are adhered with $SiO_2$, which has been formed by thermal decomposition of ethyl silicate. Carbon dioxide and vapor are also formed by burning an ethyl moiety of the ethyl silicate at the thermal decomposition. Carbon dioxide and vapor are emitted from the layer to form micro voids between the particles, as is shown in FIG. 1 of the publication.

Japanese Patent Provisional Publication No. 7(1995)-48527 discloses an anti-reflection film comprising inorganic powder of porous silica and a binder.

Japanese Patent Provisional Publications No. 9(1997)-288201 discloses an anti-reflection film having a low refractive index layer in which micro particles of a fluoropolymer are superposed upon each other to form micro voids surrounded by the particles.

SUMMARY OF THE INVENTION

A low refractive index layer containing micro voids is characterized in that the refractive index is very low because of the air present in the voids.

The low refractive index layer is arranged as the uppermost layer. Accordingly, the low refractive index layer is present on a surface of an anti-reflection film or a display device having the film. Therefore, a surface of the low refractive index layer is apt to be contaminated or scratched. An anti-reflective function of the low refractive index layer is degraded by contamination or scratch.

An overcoating layer containing a fluorine compound provided on a surface layer has a function of protecting the surface layer from contamination or scratch. The overcoating layer has been known in not only the anti-reflection film but also the other technical fields. However, the present inventors have found that the overcoating layer causes a serious problem on the low refractive index layer. A coating solution of the overcoating layer invades micro voids of the low refractive index layer to decrease a void volume ratio of the layer. The refractive index of the layer increases with decreasing the void volume ratio.

An object of the present invention is to provide an anti-reflection film in which a surface of a low refractive index layer is protected from contamination or scratch without increasing the refractive index of the layer.

The present invention provides an anti-reflection film comprising a transparent support and a low refractive index layer, a refractive index of said low refractive index layer being lower than a refractive index of the transparent support, and said low refractive index layer containing micro voids in an amount of 3 to 50 volume % of the low refractive index layer, wherein the anti-reflection film further has an overcoating layer provided on the low refractive index layer, said overcoating layer containing a fluorine compound, and wherein the fluorine compound is not present in the micro voids, or an amount of the fluorine compound present in the micro voids is less than 70 volume % of the micro voids.

The invention also provides a display device having a display surface covered with the anti-reflection film defined above.

The present inventors have succeeded in keeping at least 70 volume % of micro voids of a low refractive index layer after forming an overcoating layer containing a fluorine compound.

First, the present inventors have used particles of the fluorine compound having an average particle size of not less than 10 nm. Open of the void is clogged with the particle to keep the void volume ratio of the low refractive index layer.

Second, the inventors have adjusted a coating amount of the overcoating layer to keep the void volume ratio. The coating amount is preferably less than 80 volume % of the micro voids of the low refractive index layer.

Third, the inventors have used a fluoropolymer having a weight average molecular weight of not less than 20,000. Since the fluoropolymer of a high molecular weight is viscous, the fluoropolymer does not invade the micro voids of the low refractive index layer.

Therefore, the anti-reflection film of the invention has a surface of a low refractive index layer protected from contamination or scratch without increasing the refractive index of the layer.

DETAILED DESCRIPTION OF THE INVENTION

[Layered structure]

The layered structure is described below by referring to the drawings.

FIG. 1 is a cross-sectional view schematically showing layered structure of anti-reflection films.

Figure 1A:
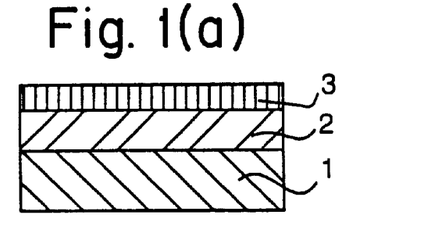
FIGS. 1(a)–1(d) are cross-sectional view schematically showing layered structure of anti-reflection films.
Figure 1B:
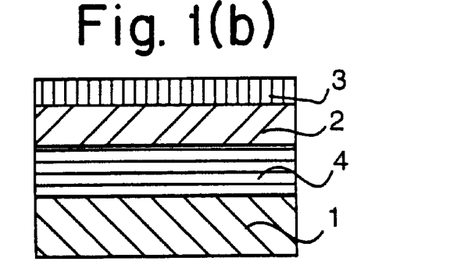

The embodiment of (a) shown in FIG. 1 comprises a transparent support (1), a low refractive index layer (2) and an overcoating layer (3) in the order. The refractive index (Re1) of the transparent support (1) and the refractive index (Re2) of the low refractive index layer (2) satisfy the following formula.

$$Re1 < Re2$$

The embodiment of (b) shown in FIG. 1 comprises a transparent support (1), a hard coating layer (4), a low refractive index layer (2) and an overcoating layer (3) in the order. The refractive index (Re1) of the transparent support (1) and the refractive index (Re2) of the low refractive index layer (2) satisfy the above-mentioned formula.

Figure 1C:
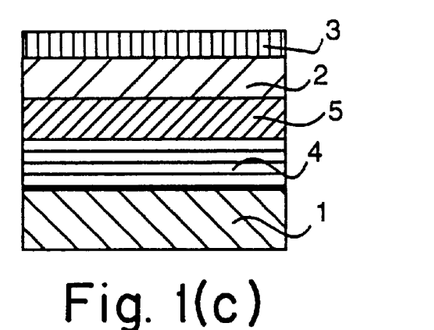

The embodiment of (c) shown in FIG. 1 comprises a transparent support (1), a hard coating layer (4), a high refractive index layer (5), a low refractive index layer (2) and an overcoating layer (3) in the order. The refractive index (Re1) of the transparent support (1), the refractive index (Re5) of the high refractive index layer and the refractive index (Re2) of the low refractive index layer (2) satisfy the following formula.

$$Re1 < Re2 < Re5$$

Figure 1D:
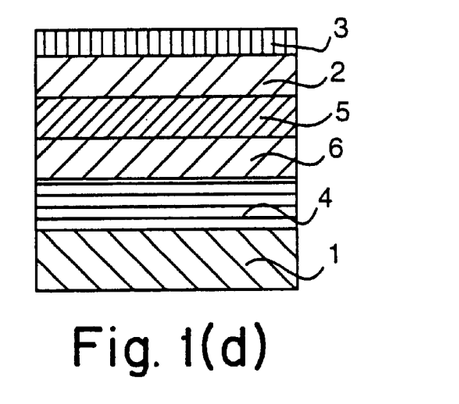

The embodiment of (d) shown in FIG. 1 comprises a transparent support (1), a hard coating layer (4), a middle refractive index layer (6), a high refractive index layer (5), a low refractive index layer (2) and an overcoating layer (3) in the order. The refractive index (Re1) of the transparent support (1), the refractive index (Re6) of the middle refractive index layer (6), the refractive index (Re5) of the high refractive index layer and the refractive index (Re2) of the low refractive index layer (2) satisfy the following formula.

$$Re1 < Re2 < Re6 < Re5$$

Figure 2:
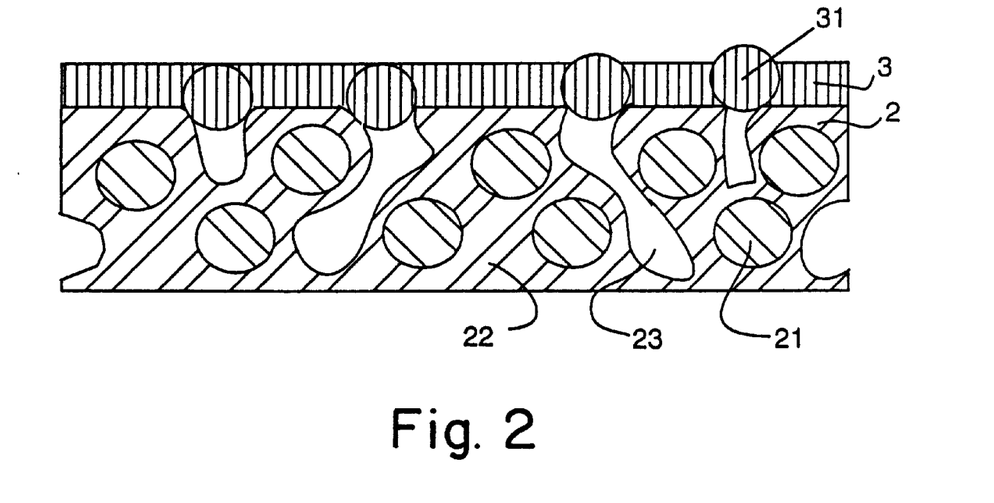
FIG. 2 is a cross-sectional view schematically showing a low refractive index layer and an overcoating layer according to a preferred embodiment of the present invention.

FIG. 2 is a cross-sectional view schematically showing a low refractive index layer and an overcoating layer according to a preferred embodiment of the present invention.

The low refractive index layer (2) shown in FIG. 2 comprises particles (21) and a binder polymer (22). Micro voids (23) are surrounded by the particles (21). The micro voids can be contained in the particles. The overcoating layer (3) contains particles (31) made of a fluorine compound. The particles (31) have an average particle size of not less than 10 nm. Open of the void (23) is clogged with the particle (31) to keep the void volume ratio of the low refractive index layer (2) after the overcoating layer (3) is formed.

Figure 3:
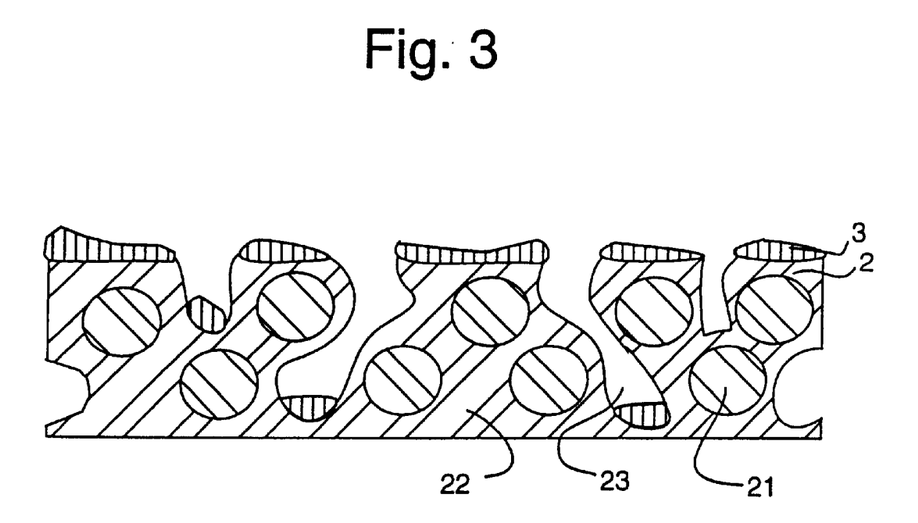
FIG. 3 is a cross-sectional view schematically showing a low refractive index layer and an overcoating layer according to another preferred embodiment of the invention.

FIG. 3 is a cross-sectional view schematically showing a low refractive index layer and an overcoating layer according to another preferred embodiment of the invention.

The low refractive index layer (2) shown in FIG. 3 also comprises particles (21) and a binder polymer (22). Micro voids (23) are surrounded by the particles (21). The amount of the overcoating layer (3) is adjusted to not less than 80 volume % of the micro voids (23). In other words, the amount of the overcoating layer (3) is so adjusted that the overcoating layer (3) is only attached on the surface of the low refractive index layer (2). Accordingly, only a small amount of the overcoating layer (3) invades the micro voids (23) of the low refractive index layer (2) to keep the void volume ratio of the low refractive index layer (2) after the overcoating layer (3) is formed.

Figure 4:
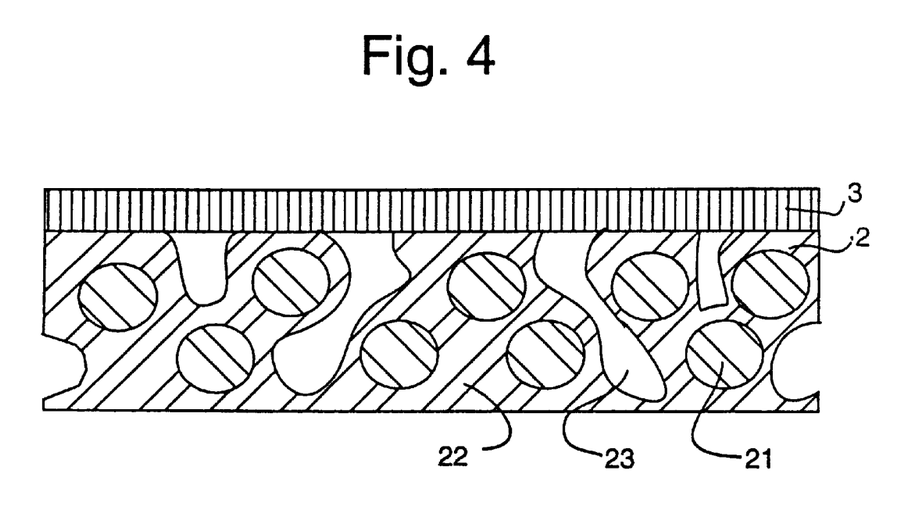
FIG. 4 is a cross-sectional view schematically showing a low refractive index layer and an overcoating layer according to a further preferred embodiment of the invention.

FIG. 4 is a cross-sectional view schematically showing a low refractive index layer and an overcoating layer according to a further preferred embodiment of the invention.

The low refractive index layer (2) shown in FIG. 4 also comprises particles (21) and a binder polymer (22). Micro voids (23) are surrounded by the particles (21). The overcoating layer (3) contains a fluoropolymer having a weight average molecular weight of not less than 20,000. The overcoating layer (3) covers the surface of the low refractive index layer (2), but does not invade the micro voids (23) because the fluoropolymer is viscous. Therefore, the void volume ratio of the low refractive index layer (2) is maintained after the overcoating layer (3) is formed. According to the embodiment shown in FIG. 4, the amount of the overcoating layer (3) can be more than the volume of the micro voids (23) to keep the void volume ratio. As is shown in FIG. 4, the overcoating layer (3) is a continuous layer covering the surface of the low refractive index layer (2).

[Transparent support]

The transparent support is generally made of a transparent polymer (plastic) film. Examples of the polymers include cellulose derivatives (e.g., triacetyl cellulose, diacetyl cellulose, propionyl cellulose, butyryl cellulose, acetyl propionyl cellulose, nitro cellulose), polyamides, polycarbonates, polyesters (e.g., polyethylene terephthalate, polyethylene naphthalate, poly-1,4-cyclohexanedimethylene terephthalate, polyethylene 1,2-diphenoxyethane-4,4,-dicarboxylate, polybutylene terephthalate), polystyrene (e.g., syndiotactic polystyrene), polyolefins (e.g., polypropylene, polyethylene, polymethylpentene), polysulfone, polyethersulfone, polyarylate, polyether imide, polymethyl methacrylate and polyether ketone. Triacetyl cellulose, polycarbonate and polyethylene terephthalate are preferred.

The transparent support has a light transmittance preferably of not less than 80%, more preferably of not less than 86%. The transparent support has a haze preferably of not more than 2.0%, more preferably of not more than 1.0%. The transparent support has a refractive index preferably in the range of 1.4 to 1.7.

[Hard coating -layer]

A hard coating layer is preferably provided on a surface of the support to protect the support from scratch, as is shown in (b) of FIG. 1.

The hard coating layer preferably contains a cross-linked polymer. The hard coating layer containing the cross-linked polymer can be formed by coating on a transparent support a coating solution containing a polyfunctional monomer and a polymerization initiator and polymerizing the polyfunctional monomer.

The polyfunctional monomer preferably is an ester of a polyhydric alcohol and acrylic acid or methacrylic acid. Examples of the polyhydric alcohols include ethylene glycol, 1,4-cyclohexanol, pentaerythritol, trimethylolpropane, trimethylolethane, dipentaerythritol, 1,2,4-cyclohexanol, polyurethanepolyol and polyesterpolyol.
Trimethylolpropane, pentaerythrytol, dipentaerythrytol and polyurethanepolyol are preferred. Two or more polyfunctional monomers can be used in combination.

The polymerization reaction of the polyfunctional monomer is preferably conducted by using a photopolymerization initiator. Examples of the photopolymerization initiators include acetophenones, benzophenones, Michler's benzoyl benzoates, α-amyloxim esters tetramethylthiuram monosulfides and thioxanthone. A sensitizing agent can be used in combination of the photopolymerization initiator. Examples of the sensitizing agents include n-butylamine, triethylamine, tri-n-butylphosphine, Michler's ketone and thioxanthone.

The photopolymerization initiator is used preferably in an amount of 0.1 o 15 weight parts, and more preferably in an amount of 1 to 10 weight parts based on 100 weight parts of the polyfunctional monomer.

The photopolymerization reaction is preferably conducted by irradiating the hard coating layer with an ultraviolet ray after coating and drying the hard coating layer.

The hard coating layer preferably further contains a filler. The filler has a function of hardening the hard coating layer and preventing the polyfunctional monomer from shrinking at the polymerization reaction. An inorganic or organic particle can be used as the filler. Examples of the inorganic particles include silicon dioxide particles, titanium dioxide particles, aluminum oxide particles, tin oxide particles, calcium carbonate particles, barium sulfate particles, talc, kaolin and calcium sulfate particles. Examples of the organic particles include methacrylic acid-methyl acrylate copolymer particles, silicone resin particles, polystyrene particles, polycarbonate particles, acrylic acid-styrene copolymer particles, benzoguanamine resin particles, melamine resin particles, polyolefin particles, polyester particles, polyamide particles, polyimide particles and polyethylene fluoride particles.

The filler has an average particle size preferably in the range of 0.01 to 2 $\mu$m, and more preferably in the range of 0.02 to 0.5 $\mu$m.

The hard coating layer or a coating solution of the layer can further contain a colorant (pigment, dye), a defoaming agent, a viscosity increaser, a levering agent, an ultraviolet absorbent, an antioxidant and a modifier resin.

The hard coating layer has a thickness preferably in the range of 1 to 15 $\mu$m.

[High and middle refractive index layers]

A high refractive index layer can be provided between the transparent support and the low refractive index layer, as is shown in (c) of FIG. 1. A middle refractive index layer can further be provided between the transparent support and the high refractive index layer, as is shown in (d) of FIG. 1.

The high-refractive index layer has a refractive index preferably in the range of 1.65 to 2.40, and more preferably in the range of 1.70 t 2.20.

The refractive index of the middle refractive index layer is so arranged that the index is between the refractive index of the transparent support and the refractive index of the high refractive index layer. The middle refractive index layer has a refractive index preferably in the range of 1.55 to 1.70.

The high or middle refractive index layer has a haze preferably of not more than 5%, more preferably of not more than 3%, and most preferably of not more than 1%.

The high or middle refractive index layer has hardness preferably of harder than H, more preferably of harder than 2H, and most preferably harder than 3H according to a pencil hardness test using a weight of 1 kg.

The high or middle refractive index layer preferably contains inorganic particles and a binder polymer.

The inorganic particles contained in the high or middle refractive index layer have a refractive index preferably in the range of 1.80 to 2.80, and more preferably in the range of 1.90 to 2.80.

Primary particles of the inorganic particles have a weight average particle size preferably in the range of 1 to 150 nm, more preferably in the range of 1 to 100 nm, and most preferably in the range of 1 to 80 nm.

The inorganic particles contained in the coated layer have a weight average particle size preferably in the range of 1 to 200 nm, more preferably in the range of 5 to 150 nm, further preferably in the range of 10 to 100 nm and most preferably in the range of 10 to 80 nm.

The inorganic particles have a specific surface area preferably in the range of 10 to 400 $m^2$ per g, more preferably in the range of 20 to 200 $m^2$ per g, and most preferably in the range of 30 to 150 $m^2$ per g.

The inorganic particles are preferably made of a metal oxide or a metal sulfide. Examples of the metal oxides or sulfides include titanium dioxide (e.g., rutile, mixed crystal of rutile and anatase, anatase, amorphous), tin oxide, indium oxide, zinc oxide, zirconium oxide and zinc sulfide. Titanium dioxide, tin oxide and indium oxide are preferred. The inorganic particles can contain another element in addition to the main component (metal oxide or sulfide). The main component means that the content (wt. %) in the particles is larger than the other elements. Examples of the other elements include Ti, Zr, Sn, Sb, Cu, Fe, Mn, Pb, Cd, As, Cr, Hg, Zn, Al, Mg, Si, P and S.

The inorganic particles can be subjected to a surface treatment. The surface treatment is conducted by using an inorganic or organic compound. Examples of the inorganic compounds include alumina, silica, zirconium oxide and iron oxide. Alumina and silica are preferred. Examples of the organic compounds include polyol, alkanol amine, stearic acid, a silane coupling agent and a titanate coupling agent. The silane coupling agent is preferred. Two or more surface treatments can be conducted in combination.

The inorganic particles preferably have a grainy shape, a spherical shape, a cubic shape, a spindle shape or an amorphous shape.

Two or more kinds of inorganic particles can be used in combination in the high or middle refractive index layer.

The ratio of the inorganic particles in the high or middle refractive index layer is preferably in the range of 5 to 60 volume %, more preferably in the range of 10 to 60 volume %, and most preferably in the range of 20 to 55 volume %.

The inorganic particles are used in the form of a dispersion to form a high or middle refractive index layer. The dispersing medium of the particles preferably is a liquid having a boiling point in the range of 60 to 170° C.

The inorganic particles preferably have a grainy shape, a spherical shape, a cubic shape, a spindle shape or an amorphous shape.

Two or more kinds of inorganic particles can be used in combination in the high or middle refractive index layer.

The inorganic particles are used preferably in an amount of 5 to 65 volume %, more preferably in an amount of 10 to 60 volume %, and most preferably in an amount of 20 to 55 volume % based on the high or middle refractive index layer.

The inorganic particles are used in the form of a dispersion to form a high or middle refractive index layer. The dispersing medium of the inorganic particles preferably is a liquid having a boiling point in the range of 60 to 170° C. Examples of the dispersing mediums include water, alcohol (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, N-methylpyrrolidone), ethers (e.g., diethyl ether, dioxane, tetrahydrofuran), ether alcohols (e.g., 1-methoxy-2-propanol). Toluene, xylene, methyl ethyl ketone, methyl isobutyl ketone, cyclohexanone and butanol are preferred.

The inorganic particles can be dispersed in the medium by using a dispersing machine. Examples of the dispersing machines include a sand grinder mill (e.g., pin type beads mill), a high speed impeller mill, a pebble mill, a roller mill, an attritor and a colloid mill. The sand grinder mill and the high speed impeller mill are preferred. A preliminary dispersing process can be conducted before the dispersing process. The preliminary dispersing process can be conducted by using a preliminary dispersing machine. Examples of the preliminary dispersing machines include a ball mill, a three-rolls mill, a kneader and an extruder.

The high or middle refractive index layer preferably contains a binder polymer having a relatively high refractive index. Examples of the high refractive index polymers include polystyrene, styrene copolymers, polycarbonate, melamine resins, phenol resins, epoxy resins and polyurethane. The polyurethane is preferably obtained by a reaction of a cyclic (aliphatic or aromatic) isocyanate and polyol. The other cyclic (aromatic, heterocyclic or alicyclic) polymers or polymers substituted with a halogen atom other than fluorine also have a high refractive index. The polymer can be formed by a radical polymerization of a monomer having a double bond.

[Low refractive index layer]

The low refractive index layer has a refractive index preferably in the range of 1.20 to 1.55, and more preferably in the range of 1.30 to 1.55.

The low refractive index layer has a thickness preferably in the range of 50 to 400 nm, and more preferably in the range of 50 to 200 nm.

Before forming an overcoating layer, the low refractive index layer has a void volume content in the range of 3 to 50 volume %, and preferably in the range of 5 to 35 volume %. The micro voids of the low refractive index layer can be formed by using particles. The micro voids are surrounded by the particles, or formed in the particles.

The particles have an average particle size preferably in the range of 0.5 to 200 nm, more preferably in the range of 1 to 100 nm, further preferably in the range of 3 to 70 nm, and most preferably in the range of 5 to 40 nm. The particle size distribution preferably is uniform (monodispersed).

Inorganic particles or organic particles can be used in the low refractive index layer.

The inorganic particles preferably are amorphous.

The inorganic particles are preferably made of a metal oxide, a metal nitride, a metal sulfide or a metal halide, more preferably made of a metal oxide or a metal halide, and most preferably made of a metal oxide or a metal fluoride. Examples of the metal atoms include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni. Mg, Ca, B and Si are preferred. The inorganic compounds can contain two or more metal atoms.

The most preferred inorganic compound is silicon dioxide, namely silica.

The micro voids can be formed in the inorganic particles, for example by cross-linking silica contained in the particles. The silica shrinks after the cross-linking reaction to form porous particles.

Inorganic porous particles can be directly synthesized according to a sol-gel method (described in Japanese Patent Provisional Publication No. 53(1978)-112732 and Japanese Patent Publication No. 57(1982)-9051) or a precipitation method (described in APPLIED OPTICS, 27, pp.3356 (1988)). The particle dispersion can also be obtained by crushing inorganic powder, which is formed according to a dry precipitation method. Commercially available porous inorganic particles (for example, silicon dioxide sol) can also be used in the low refractive index layer.

The inorganic particles are preferably dispersed in a medium to form a low refractive index layer. Examples of the dispersing mediums include water, alcohols (e.g., methanol, ethanol, isopropanol) and ketones (e.g., methyl ethyl ketone, methyl isobutyl ketone).

The organic particles also preferably are amorphous.

The organic particles are preferably made of a polymer, which is obtained by a polymerization reaction (for example according to an emulsion polymerization method) of a monomer. The polymer preferably is a fluoropolymer. The fluoropolymer contains fluorine atom preferably in an amount of 35 to 80 wt. %, and more preferably in an amount of 45 to 75 wt. %.

Examples of fluoromonomers include fluoroolefins (e.g., fluoroethylene, vinylidene fluoride, tetrafluoroethylene, hexafluoropropylene, perfluoro-2,2-dimethyl-1,3-diol), fluoroalkyl esters of acrylic or methacrylic acid and fluorovinyl ethers. A copolymer of a fluoromonomer and another monomer can also be used in the organic particle. Examples of the other monomers include olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate), styrenes (e.g., styrene, vinyltoluene, α-methylstyrene), vinyl ethers (e.g., methyl vinyl ether), vinyl esters (e.g., vinyl acetate, vinyl propionate), acrylamides (e.g., N-tert-butylacrylamide, N-cyclohexylacrylamide), methacrylamides and acrylonitriles.

The micro voids can be formed in the organic particles, for example by cross-linking a polymer contained in the particles. The polymer shrinks after the cross-linking reaction to form porous particles. At least 20 mol % of the monomers preferably are polyfunctional monomers to obtain a cross-linked polymer. The ratio of the polyfunctional monomer is more preferably in the range of 30 to 80 mol %, and most preferably in the range of 35 to 50 mol %.

Examples of the polyfunctional monomers include dienes (e.g., butadiene, pentadiene), acrylic esters of polyhydric alcohols (e.g., ethylene glycol diacrylate, 1,4-cyclohexane diacrylate, dipentaerythrytol hexaacrylate), methacrylic esters of polyhydric alcohols (e.g., ethylene glycol dimethacrylate, 1,2,4-cyclohexane tetramethacrylate, pentaeythritol tetramethacrylate), divinyl compounds (e.g., divinylcyclohexane, 1,4-divinylbenzene), divinyl sulfone, bisacrylamides (e.g., methylene bisacrylamide) and bis-methacrylamides.

The micro voids can also be formed by superposing particles upon each other. The formed micro voids are surrounded by the particles. If spherical particles having the same particle size (completely monodispersed particles) are superposed according to closest packing, micro voids of 26 volume % are formed between the particles. If spherical particles having the same particle size are superposed according to primitive cubic packing, micro voids of 48 volume % are formed between the particles. In a practical low refractive index layer, the particle size has distribution and the particle can also contain micro voids. Accordingly, the practical volume content is different from the above-described theoretical contents.

The refractive index of the low refractive index layer decreases by increasing the void-volume ratio. The size of the micro voids surrounded by the particles can be adjusted according to the particle size. The size of the micro voids is preferably so adjusted that the micro voids do not scatter light, and do no degrade the mechanical strength of the low refractive index layer. The size of the micro voids can be uniform by using monodispersed particles. Therefore, the low refractive index layer can be formed as an optically macroscopically uniform membrane, even though the layer microscopically is a porous membrane containing micro voids.

The macroscopic refractive index of the low refractive index layer is smaller than the sum of the refractive indices of the components of the layer. The particle and the polymer have refractive indices of larger than 1. On the other hand, the air contained in the micro void has a refractive index of 1.00. Therefore, the refractive index is decreased by forming micro voids in the low refractive index layer.

The micro voids can be closed in the low refractive index layer by the particles or the polymer. If the micro voids are closed in the layer, the micro voids remain after forming the overcoating layer. The closed micro voids have another advantage that the surface of the low refractive index layer is relatively smooth compared with opened micro voids. The low refractive index layer preferably has a smooth surface, which does not remarkably scatter light.

The low refractive index layer preferably contains a polymer. The polymer has a function of adhering particles to keep the micro void structure of the low refractive index layer. The amount of the polymer is preferably so adjusted that the polymer does not invade the micro voids, and keeps the mechanical strength of the layer. The amount of the polymer is preferably in the range of 5 to 50 wt. %, and more preferably in the range of 10 to 30 wt. % based on the amount of the low refractive index layer.

The particles are adhered with the polymer by (1) combining a surface treating agent of the particle to the polymer, (2) forming a polymer shell around the particle (core), or (3) using the polymer as a binder of the particles.

The shell polymer (2) is preferably formed by a polymerization reaction around the particle before preparing a coating solution of a low refractive index layer. The binder polymer (3) is preferably formed by a polymerization reaction of monomers simultaneously with or after coating the low refractive index layer. The monomer of the binder polymer (3) is preferably contained in a coating solution of the low refractive index layer. Two or three polymers (1) to (3) are preferably used in combination. A combination of (1) and (3) or a combination of (1) to (3) are more preferred. The surface treatment polymer (1) is preferably identical with the shell polymer (2) or the binder polymer (3).

The surface treatment (1), the shell (2) and the binder (3) are described below in more detail.

(1) Surface treatment

The particles (particularly inorganic particles) are preferably subjected to a surface treatment to improve an affinity with the polymer. The surface treatment can be classified into a physical treatment (such as a plasma discharge treatment, a corona discharge treatment) and a chemical treatment using a coupling agent. The chemical treatment only, or a combination of the physical treatment and the chemical treatment is preferably conducted. An organo alkoxy metal compound (e.g., titanium coupling agent, silane coupling agent) is preferably used in the chemical treatment. The silane coupling agent is particularly effective in treating silicon dioxide particles.

Examples of the silane coupling agents include alkyl esters of orthosilicate (e.g., methyl orthosilicate, ethyl orthosilicate, n-propyl orthosilicate, isopropyl orthosilicate, n-butyl orthosilicate, sec-butyl orthosilicate, t-butyl orthosilicate) and a hydrolysis product thereof.

The chemical surface treatment can be conducted by adding a coupling agent to a dispersion of particles, and leaving the mixture at the room temperature to 60° C. for several hours to 10 days. An inorganic acid (e.g., sulfuric acid, hydrochloric acid, nitric acid, chromic acid, hypochlorous acid, boric acid, orthosilicic acid, phosphoric acid, carbonic acid) or an organic acid (e.g., acetic acid, polyacrylic acid, benzenesulfonic acid, phenol, polyglutamic acid) or salts thereof (e.g., metal salt, ammonium salt) can be added to the particle dispersion to accelerate a surface treatment reaction.

(2) Shell

The shell polymer preferably has a saturated hydrocarbon main chain. The polymer preferably contains fluorine atom in its main chain or side chain, and more preferably in its side chain. An acrylic ester or a methacrylic ester is preferred, and an acrylic ester or a methacrylic ester of an alcohol containing fluorine atom is more preferred.

The refractive index of the shell polymer decreases with increasing the contents of the fluorine atoms in the polymer. The shell polymer preferably contains fluorine atoms in an amount of 35 to 80 wt. %, and more preferably in an amount of 45 to 75 wt. % to decrease the refractive index of the layer.

The fluoropolymer is obtained by a polymerization reaction of a fluoromonomer. Examples of fluoromonomers include fluoroolefins (e.g., fluoroethylene, vinylidene fluoride, tetrafluoroethylene, hexafluoropropylene, perfluoro-2,2-dimethyl-1,3-diol), fluoroalkyl esters of acrylic or methacrylic acid and fluorovinyl ethers.

A copolymer of a fluoromonomer and another monomer can also be used as the shell polymer. Examples of other monomers include olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate), styrenes (e.g., styrene, vinyltoluene, α-methylstyrene), vinyl ethers (e.g., methyl vinyl ether), vinyl esters (e.g., vinyl acetate, vinyl propionate), acrylamides (e.g., N-tert-butylacrylamide, N-cyclohexylacrylamide), methacrylamides and acrylonitriles.

In the case that the shell polymer is used in combination with the binder polymer (described below), the shell polymer can be chemically bound to the binder polymer by a cross-linking reaction.

The shell polymer can be crystal. In the case that the glass transition temperature (Tg) is higher than the temperature at which the low refractive index layer is formed, the micro void structure can easily be kept after forming the layer. However, the high Tg shell polymer does not sufficiently adhere the particles. If the particles are not sufficiently adhered to each other, the low refractive index layer is not formed as a continuous layer (as a result, the mechanical strength is degraded). Accordingly, the binder polymer is preferably used to form a continuous layer in the case that the high Tg shell polymer is used.

The shell polymer is formed around the particle to form a core/shell particle. The core/shell particle preferably contains a core (preferably inorganic core) preferably in an amount of 5 to 90 volume %, and more preferably in an amount of 15 to 80 volume %.

The shell polymer is preferably formed according to a radical polymerization method. The radial polymerization method is described in Takayuki Ootsu, Masayosi Kinoshita, "Experimental Method of Polymer Synthesis" (written in Japanese, Kagaku Dojin, 1971), and Takayuki Ootsu, "Course of Polymerization Reaction Theory 1, Radical Polymerization (I)" (written in Japanese, Kagaku Dojin, 1971). The radical polymerization is preferably conducted according to an emulsion polymerization method or a dispersion polymerization method. The emulsion polymerization method is described in Soichi Muroi, Chemistry of Polymer Latex (written in Japanese, Kobunshi Kankokai, 1970). The dispersion polymerization method is described in Barrett, Keih E. J., Dispersion Polymerization in Organic Media (John Wiley & Sons, 1975).

A thermal polymerization initiator is used in the polymerization reaction.

Examples of the thermal polymerization initiators for the emulsion polymerization method include inorganic peroxides (e.g., potassium persulfate, ammonium persulfate), azonitrile compounds (e.g., sodium azobiscyanovalerate), azoamidine compounds (e.g., hydrochloric salt of 2,2'-azobis(2-methylpropionamide)), cyclic azoamidine compounds (e.g., hydrochloric salt of 2,2'-azobis[2-(5-methyl-2-imidazoline-2-yl)propane) and azoamide compounds (e.g., 2,2'-azobis{2-methyl-N-[1,1'-bis(hydroxymethyl)-2-hydroxyethyl]}propionamide). The inorganic peroxides are preferred, and potassium persulfate and ammonium persulfate are more preferred.

Examples of the thermal polymerization initiators for the dispersion polymerization method include azo compounds (e.g., 2,2'-azobisisoburyronitrile, 2,2'-azobis(2,4-divaleronitrile), dimethyl-2,2'-azobis(2-methylpropionate), dimethyl-2,2'-azobisisobutylate) and organic peroxides (e.g., lauryl peroxide, benzoyl peroxide, tert-butyl peroctoate).

The dispersion polymerization method is preferably conducted by adding a polymer dispersing agent to surface treated particles, dissolving a monomer and a polymerization initiator in the dispersion and conducting a polymerization reaction. The formed polymer preferably is insoluble in a polymerization reaction medium.

Examples of the polymerization reaction mediums include water, alcohols (e.g., methanol, ethanol, propanol, isopropanol, 2-methoxy-1-propanol, butanol, t-butanol, pentanol, neopentanol, cyclohexanol, 1-methoxy-2-propanol), methyl ethyl ketone, acetonitrile, tetrahydrofuran and ethyl acetate. Water, methanol, ethanol and isopropanol are preferred. Two or more reaction mediums can be used in combination.

A chain transfer agent can be used in the emulsion or dispersion polymerization method. Examples of the chain transfer agents include halogenated hydrocarbons (e.g., carbon tetrachloride, carbon tetrabromide, ethyl dibromoacetate, ethyl tribromoacetate, dibromoethylbenzene, dibromoethane, dichloroethane), hydrocarbons (e.g., benzene, ethylbenzene, isopropylbenzene), thioethers (e.g., (e.g., diazothioether), mercaptan (e.g., t-dodecylmercaptan, n-dodecylmercaptan, hexadecylmercaptan, n-octadecylmercaptan, thioglycelol), disulfides (e.g., diisopropyl xanthate disulfide), thioglycolic acids and derivatives thereof (e.g., thioglycolic acid, 2-ethylhexyl thioglycolate, butyl thioglycolate, methoxybutyl thioglycolate, trimethylolpropane tris(thioglycolate)).

Two or more core/shell particles can be used in combination. Inorganic particles (having no shell) can also used in combination with the core/shell particle.

(3) Binder

The binder polymer preferably has a saturated hydrocarbon main chain or a polyether main chain. The main chain is more preferably made of saturated hydrocarbon. The binder polymer is preferably cross-linked.

The saturated hydrocarbon polymer can be obtained by a polymerization reaction of an ethylenically unsaturated monomer. The monomer preferably has two or more ethylenically unsaturated groups to obtain a cross-linked polymer.

Examples of the monomers having two or more ethylenically unsaturated groups include acrylic or methacrylic esters of polyhydric alcohols (e.g., ethylene glycol di(meth) acrylate, 1,4-cyclohexane di(meth)acrylate, pentaerythritol tetra(meth)acrylate, pentaerythritol tri(meth)acrylate, trimethylolpropane tri(meth)acrylate, trimethylolethane tri (meth)acrylate, dipentaerythrytol tetra(meth)acrylate, dipentaerythrytol penta(meth)acrylate, dipentaerythrytol hexa (meth)acrylate, pentaerythrytol hexa(meth)acrylate, 1,2,3-cyclohexane tetramethacrylate, polyurethane polyacrylate, polyester polyacrylate), vinyl-benzene and derivatives thereof (e.g., 1,4-divinylbenzene, 2-acryloylethyl 4-vinylbenzoate, 1,4-divinylcyclohexanone), vinyl sulfones (e.g., divinyl sulfone), acrylamides (e.g., methylenebisacrylamide) and methacrylamides.

The polyether polymer can be obtained by a ring opening reaction of a polyfunctional epoxy compound.

In place of or in addition to the monomers having two or more ethylenically unsaturated groups, the binder polymer can be cross-linked by using a reaction of cross-linking groups. Examples of the cross-linking groups include an isocyanate group, an epoxy group, an aziridine group, an oxazoline group, an aldehyde group, a carbonyl group, a hydrazine group, a carboxyl group, a methylol group and an active methylene group. A cross-linking monomer can also be used to form a cross-linking structure. Examples of the cross-linking monomers include vinyl sulfonate, acid anhydride, cyanoacrylate derivatives, melamine, methylol ether, ester and urethane. A cross-linking group can function after a decomposition reaction. For example, a blocked isocyanate group can function as the cross-linking group after the blocking group is decomposed.

The polymerization reaction of the binder polymer is preferably conducted by using a photopolymerization initiator rather than the thermal polymerization initiator (used in the synthesis of the shell polymer). Examples of the photopolymerization initiators include acetophenones, benzoins, benzophenones, phosphine oxides, ketals, anthraquinones, thioxanthones, azo compounds, peroxides, 2,3-dialkyldiones, disulfides, fluoroamines and aromatic sulfoniums. Examples of the acetophenones include 2,2-diethoxy-acetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyl diphenyl phosphine oxide.

In the case that the binder polymer is used in combination with the shell polymer, the glass transition temperature (Tg) of the binder polymer is preferably lower than the Tg of the shell polymer. The difference in Tg is preferably not smaller than 5° C., more preferably not smaller than 20° C.

The binder polymer is preferably formed by adding a monomer to a coating solution of the layer and conducting a polymerization reaction (and a cross-linking reaction, if necessary) simultaneously with or after coating the layer.

A small amount of another polymer can be added to a coating solution of the low refractive index layer. Examples of the other polymers include polyvinyl alcohol, polyoxyethylene, polymethyl methacrylate, polymethyl acrylate, diacetylcellulose, triacetylcellulose, nitrocellulose, polyester and an alkyd resin.

[Overcoating layer]

The overcoating layer is formed by coating a coating solution containing a fluorine compound on the low refractive index layer. According to the present invention, the overcoating layer comprises less than 70 volume % of the micro voids of the low refractive index layer. In other words, the overcoating layer invades less than 70 volume % of the micro voids of the low refractive index layer. The overcoating layer preferably comprises less than 50 volume %, more preferably comprises 40 volume %, further preferably comprises 30 volume %, and most preferably comprises 20 volume % of the micro voids of the low refractive index layer.

The micro voids of the low refractive index layer can be maintained after forming the overcoating layer.

First, open of the void can be clogged with particles contained in the overcoating layer to keep the void volume ratio of the low refractive index layer. In more detail, the overcoating layer contains particles of the fluorine compound having an average particle size of not less than 10 nm.

Second, a coating amount of the overcoating layer can be adjusted to keep the micro voids. In more detail, the coating amount of the overcoating layer is less than 80 volume % of the micro voids of the low refractive index layer.

Third, a viscous fluoropolymer is used to keep the micro voids. In more detail, a fluoropolymer having a weight average molecular weight of not less than 20,000 is used in the overcoating layer. The third method is most preferred.

According to the first method, the particle size is larger than the size of the open of the micro voids to clog the open of the void. The particle size is preferably in the range of 10 to 100 nm, more preferably in the range of 15 to 70 nm, and most preferably in the range of 20 to 50 nm. The particles of the fluorine compounds can be formed by emulsifying a solution of the fluorine compound. Further, the particles can be precipitated from the solution of the fluorine compound. A latex of the fluorine compound can also be used as the particles. The latex can be formed by an emulsion polymerization of a fluoromonomer. A commercially available particle dispersion of a fluorine compound can be used in the overcoating layer.

According to the second method, the amount of the overcoating layer is so adjusted that the overcoating layer is only attached on the surface of the low refractive index layer, and does not invade the micro voids. The coating amount of the overcoating layer is more preferably less than 70 volume %, and most preferably less than 60 volume % of the micro voids of the low refractive index layer. The coating amount of the overcoating layer is usually more than 2 mg per m$^2$.

According to the third method, a viscous fluoropolymer is used to keep the micro voids. The weight average molecular weight of the fluoropolymer is preferably in the range of 40,000 to 2,000,000, and more preferably in the range of 50,000 to 1,000,000.

The overcoating layer contains a fluorine compound. A fluorine surface active agent, a fluoropolymer, an ether fluoride and a silane fluoride are preferably used as the fluorine compound.

The fluorine surface active agent comprises a hydrophilic moiety and a hydrophobic moiety. The hydrophilic moiety is anionic, cationic, nonionic or amphoteric. The hydrophobic moiety is hydrocarbon in which some or all of hydrogen is substituted with fluorine.

The fluoropolymer is preferably obtained by a polymerization reaction of an ethylenically unsaturated monomer containing fluorine atom (fluoromonomer). Examples of the fluoromonomers include fluoroolefins (e.g., fluoroethylene, vinylidene fluoride, tetrafluoroethylene, hexafluoropropylene, perfluoro-2,2-dimethyl-1,3-diol), fluoroalkyl esters of acrylic or methacrylic acid and fluorovinyl ethers. Two or more fluoromonomers can be used to form a copolymer.

A copolymer of a fluoromonomer and another monomer can also be used in the overcoating layer. Examples of the other monomers include olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate, ethylene glycol dimethacrylate), styrenes (e.g., styrene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitriles.

A repeating unit of a polyorganosiloxane can be introduced into the fluoropolymer to improve the surface smoothness of the overcoating layer. The fluoropolymer having the repeating unit of a polyorganosiloxane can be obtained by a polymerization reaction of a fluoromonomer and a polyorganosiloxane having a reactive group as a terminal group. The reactive group is formed by chemically binding an ethylenically unsaturated monomer (e.g., acrylic acid, an ester thereof, methacrylic acid, an ester thereof, vinyl ether, styrene, a derivative thereof) to the end of the polyorganosiloxane.

A commercially available fluoropolymer such as Cytop (Asahi Glass Co., Ltd.) or Teflon AF (du Pont) can also be used in the overcoating layer.

The ether fluoride is usually used as a lubricant. Examples of the ether fluorides include perfluoropolyether and a derivative thereof.

Examples of the silane fluorides include a silane compound having a perfluoroalkyl group (e.g., heptadecafluoro-1,2,2,2-tetradecyltriethoxysilane) A commercially available silane fluoride such as KBM-7803, KP-801M (Shinetsu Chemical Co., Ltd.) can also be used in the overcoating layer.

The fluorine compound used in the overcoating layer contains fluorine atom preferably in an amount of 30 to 80 wt. %, and more preferably in an amount of 40 t 75 wt. %.

A fluoropolymer is preferably used in the overcoating layer. The fluoropolymer is more preferably cross-linked. the fluoropolymer can be cross-linked by introducing a cross-linking group into the fluoropolymer or by reacting the fluoropolymer with a cross-linking agent.

The cross-linking group is preferably introduced into the side chain of the fluoropolymer. A fluoromonomer having a cross-linking group is polymerized to obtain a fluoropolymer having the cross-linking group as a side chain.

The cross-linking agent has two or more cross-linking groups, which reacts with the side chain of the fluoropolymer to cross-link the fluoropolymer.

The cross-linking group is irradiated with light or an electron beam or heated to cause a cross-linking reaction. The cross-linking group is preferably irradiated with light, more preferably irradiated with an ultraviolet ray. The cross-linking reaction is preferably conducted at a low temperature to keep the support flat and to shorten the heating time in the industrial production. Further, the irradiation of the ultraviolet ray can be conducted by using an inexpensive machine.

Examples of the cross-linking groups include acryloyl, methacryloyl, allyl, isocyanate, epoxy, alkoxysilyl, aziridine, oxazoline, aldehyde, carbonyl, hydrazine, carboxyl, methylol and active methylene.

The overcoating layer has a thickness preferably in the range of 2 to 50 nm, more preferably in the range of 5 to 30 nm, and most preferably in the range of 5 to 20 nm. in the electron beam. Radiation is preferred to heat.

[Anti-reflection film]

The anti-reflection film may further have other optional layers. For example, an adhesive layer, a shield layer, a slipping layer or an antistatic layer can be provided on the transparent support. The shield layer is provided to shield electromagnetic radiation or an infrared ray.

The anti-reflection film can further have an anti-glare function to scatter light. The anti-glare function can be obtained by forming a rough surface on the anti-reflection film.

The anti-reflection film has a haze preferably in the range of 3 to 30%, more preferably in the range of 5 to 20%, and most preferably in the range of 7 to 20%. the anti-reflection film can be attached to various display devices such as a liquid crystal display (LCD), a plasma display panel (PDP), an electroluminescence display (ELD) or a cathode ray tube (CRT). The transparent support of the film (back surface of the film) is attached to the display surface.

EXAMPLE 1

(Preparation of coating solution for hard coating layer)

A commercially available silica hard coating material (Dezolight Z7503, JSR Co., Ltd.) was dissolved in methyl ethyl ketone to obtain a solution (solid content: 72 wt. %, silica content: 38 wt. %). To a mixture of methyl ethyl ketone and cyclohexanone (weight ratio: 50/50), 625 g of the obtained solution was added. After the mixture was stirred, the mixture was filtered with a polypropylene filter (pore size: 0.4 μm) to obtain a coating solution for a hard coating layer.

(Preparation of titanium dioxide dispersion)

With 65.2 weight parts of methyl ethyl ketone, 30 weight parts of titanium dioxide (weight average particle size of primary particles: 50 nm, refractive index: 2.70), 4.5 weight parts of anionic diacrylate monomer (PM21, Nippon Kayaku Co., Ltd.) and 0.3 weight part of cationic methacrylate monomer (DMAEA, Kojin Co., Ltd.) were mixed. The mixture was dispersed in a sand grinder to obtain a titanium dioxide dispersion.

(Preparation of coating solution for middle refractive index layer)

In 151.9 g of cyclohexanone and 37.0 g of methyl ethyl ketone, 0.14 g of a photopolymerization initiator (Irgacure 907, Ciba-Geigy) and 0.04 g of a photosensitizer (Kayacure DETX, Nippon Kayaku Co., Ltd.) were dissolved. To the solution, 6.1 g of the titanium dioxide dispersion and 2.4 g of dipentaerythrytol hexaacrylate (DPHA, Nippon Kayaku Co., Ltd.) were added. The mixture was stirred at the room temperature for 30 minutes, and filtered with a polypropylene filter (pore size: 0.4 μm) to obtain a coating solution for a middle refractive index layer.

(Preparation of coating solution for high refractive index layer)

In 1152.8 g of cyclohexanone and 37.2 g of methyl ethyl ketone, 0.06 g of a photopolymerization initiator (Irgacure 907, Ciba-Geigy) and 0.02 g of a photosensitizer (Kayacure DETX, Nippon Kayaku Co., Ltd.) were dissolved. To the solution, 13.13 g of the titanium dioxide dispersion and 0.76 g of dipentaerythrytol hexaacrylate (DPHA, Nippon Kayaku Co., Ltd.) were added. The mixture was stirred at the room temperature for 30 minutes, and filtered with a polypropylene filter (pore size: 0.4 μm) to obtain a coating solution for a high refractive index layer.

(Preparation of coating solution for low refractive index layer)

To 200 g of methanol dispersion of silica particles (Methanol Silica Sol, Nissan Chemical Co., Ltd.) having the average particle size of 15 nm, 3 g of a silane coupling agent (KBM-503, Shinetsu Silicone Co., Ltd.) and 2 g of 0.1 N hydrochloric acid were added. The mixture was stirred at the room temperature for 5 hours. The mixture was left at the room temperature for 3 days to prepare a dispersion of silica particles treated with the silane coupling agent.

To 35.04 g of the dispersion, 58.35 g of isopropanol and 39.34 g of diacetone alcohol were added. In 772.85 g of isopropanol, 1.02 g of a photopolymerization initiator (Irgacure 907, Ciba-Geigy) and 0.51 g of a photosensitizer (Kayacure DETX, Nippon Kayaku Co., Ltd.) were dissolved. The obtained solution was added to the dispersion. In the mixture, 25.6 g of dipentaerythrytol hexaacrylate (DPHA, Nippon Kayaku Co., Ltd.) was dissolved. The obtained mixture (67.23 g) was stirred at the room temperature for 20 minutes, and filtered with a polypropylene filter (pore size: 0.4 μm) to obtain a coating solution for a low refractive index layer.

(Preparation of coating solution for overcoating layer)

A thermally cross-linkable fluoropolymer (JN-7214, JSR Co., Ltd.) was added to isopropanol to obtain 0.6 wt. % coarse dispersion. The coarse dispersion was finely dispersed by ultrasonic wave to obtain a coating solution for an overcoating layer. The average particle size of the fluoropolymer particles measured by a colter counter was 30 nm.

(Preparation of anti-reflection film)

On a triacetylcellulose film (TAC-TD80U, Fuji Photo Film Co., Ltd.) having the thickness of 80 μm, the coating solution for the hard coating layer was coated by using a bar coater, dried at 90° C., and irradiated with an ultraviolet ray to harden the layer. Thus, a hard coating layer (thickness: 6 μm) was formed.

On the hard coating layer, the coating solution for the middle refractive index layer was coated by using a bar coater, dried at 60° C., and irradiated with an ultraviolet ray to form a middle refractive index layer (refractive index: 1.72, thickness: 0.081 μm).

On the middle refractive index layer, the coating solution for the high refractive index layer was coated by using a bar coater, dried at 60° C., and irradiated with an ultraviolet ray to form a high refractive index layer (refractive index: 1.92, thickness: 0.053 μm).

On the high refractive index layer, the coating solution for the low refractive index layer was coated by using a bar coater, dried at 60° C., and irradiated with an ultra-violet ray to form a low refractive index layer (refractive index: 1.40, thickness: 0.085 μm). The void volume ratio of the low refractive index layer was 16 volume %.

On the low refractive index layer, the coating solution for the low refractive index layer was coated by using a bar coater of #3, dried at 120° C. or 1 hour to prepare an anti-reflection film.

(Evaluation of anti-reflection film)

The anti-reflection film was evaluated about the following items. The results are set forth in Table 1.

(0) Ratio of overcoating layer invading micro voids

The volume % of the micro voids in the low refractive index layer was measured before and after forming the overcoating layer to obtain a ratio (volume %) of the overcoating layer invading the micro voids based on the original void volume of the low refractive index layer.

(1) Average reflectance

A spectral reflectance was measured by using a spectrometer (Japan Spectrum Co., Ltd.). The incident angle of light was 50, and the measured wavelength region was 380 to 780 nm. The average reflectance was calculated within the wavelength region of 450 to 650 nm.

(2) Refractive index of low refractive index layer

The refractive index of the low refractive index layer was obtained by fitting the results of the measured reflectance.

(3) Surface contact angle

The anti-reflection film was conditioned at 25° C. and at the relative humidity of 60% for 2 hours. After the film was conditioned, the contact angle to water was measured.

(4) Resistance to finger print mark

A finger print mark was formed on the surface of the anti-reflection film. The finger print was wiped with a cloth (Bencotton, Asahi Chemical Industries Co., Ltd.). The resistance to finger print mark was evaluated according to the following grades.

A: The finger print was easily removed.

B: The finger print was removed.

C: The finger print partially remained.

D: The finger print almost remained.

(5) Pencil hardness test

The pencil hardness test was conducted according to JIS-K-5400.

The anti-reflection film was conditioned at 25° C. and at the relative humidity of 60% for 2 hours. After the film was conditioned, pencil hardness test was conducted. The testing pencil had hardness of 2H or 3H according to JIS-S-6006. The weight was 1 kg. The test was repeated 5 times. The hardness was so determined that the scratch was not observed 3 times or more.

(6) Resistance to scratch

The resistance to scratch was evaluated by using steel wool of #0000. The weight of 400 g was applied to the area of 100 yen coin on the surface of the anti-reflection film. The steel wool went and returned on the film ten times. The resistance was evaluated according to the following grades.

A: No scratch was observed.

B: Scratch was scarcely observed.

C: Scratch was remarkably observed.

(7) Dynamic friction

The anti-reflection film was conditioned at 25° C. and at the relative humidity of 60% for 2 hours. After the film was conditioned, the dynamic friction was measured in a machine (HEIDON-14) by using stainless steel balls (diameter: 5 mm). The weight was 100 g, and the speed was 60 cm per minute.

EXAMPLE 2

The following fluorodecyl methacrylate was subjected to an emulsion polymerization reaction in the presence of a fluorine surface active agent to obtain a latex.

(Fluorodecyl methacrylate)

$CH_2=C(CH_3)COOCH_2CH_2C_8F_{17}$

The latex was dialyzed to remove the surface active agent. The latex was diluted to the solid content of 2 wt. %. In the latex, the ratio of water/methanol was 7/3.

The latex was dried at the room temperature. The particle size of the latex measured by SEM was about 15 nm.

An anti-reflection film was prepared and evaluated in the same manner as in Example 1, except that the diluted latex was used as a coating solution for the overcoating layer. The results are set forth in Table 1.

COMPARISON EXAMPLE 1

A thermally cross-linkable fluoropolymer (JN-7214, JSR Co., Ltd.) was dissolved in methyl isobutyl ketone to prepare 0.6 wt. % solution.

An anti-reflection film was prepared and evaluated in the same manner as in Example 1, except that the obtained solution was used as a coating solution for the overcoating layer. The results are set forth in Table 1.

COMPARISON EXAMPLE 2

An anti-reflection film was prepared and evaluated in the same manner as in Example 1, except that the overcoating layer was not formed.

TABLE 1

| No. | (0) | (1) | (2) | (3) | (4) | (5) | (6) | (7) |
|---|---|---|---|---|---|---|---|---|
| Ex. 1 | 25% | 0.41% | 1.42 | 100° | B | 3H | B | 0.33 |
| Ex. 2 | 33% | 0.45% | 1.44 | 98° | B | 3H | B | 0.30 |
| C1 | 94% | 0.82% | 1.47 | 104° | B | 3H | A | 0.25 |
| C2 | 0%* | 0.30% | 1.40 | 45° | D | 2H | C | 0.50 |

(Remark)
C1: Comparison Example 1
C2: Comparison Example 2
0%*: Overcoating layer was not formed.
(0) Ratio of overcoating layer invading micro voids
(1) Average reflectance
(2) Refractive index of low refractive index layer
(3) Surface contact angle
(4) Resistance to finger print mark
(5) Pencil hardness test
(6) Resistance to scratch
(7) Dynamic friction

EXAMPLE 3

A silane fluoride coupling agent (KP-801M, Shinetsu Chemical Co., Ltd.) was dissolved in a fluorine solvent (Florinate FC-7, 3M) to prepare 0.15 wt. % solution. The obtained solution was used as a coating solution for an overcoating layer.

The coating solution was coated on the low refractive index layer prepared in Example 1 by using a wire bar of #3, and dried at 120° C. for 3 minutes to prepare an anti-reflection film. The coating amount of the overcoating layer was adjusted to 19 volume % of the micro voids of the low refractive index layer. The overcoating layer invades 6 volume % of the micro voids.

The obtained anti-reflection film was evaluated in the same manner as in Example 1. The results are set fourth in Table 2.

EXAMPLE 4

A thermally cross-linkable fluoropolymer (JN-7214, JSR Co., Ltd.) was dissolved in methyl isobutyl ketone to prepare 0.3 wt. % solution. The obtained solution was used as a coating solution for an overcoating layer.

The coating solution was coated on the low refractive index layer prepared in Example 1 by using a wire bar of #3, and dried at 120° C. for 1 hour to prepare an anti-reflection film. The coating amount of the overcoating layer was adjusted to 37 volume % of the micro voids of the low refractive index layer. The overcoating layer invades 25 volume % of the micro voids.

The obtained anti-reflection film was evaluated in the same manner as in Example 1. The results are set forth in Table 2.

EXAMPLE 5

In methyl isobutyl ketone, 0.3 wt. % of a fluoropolymer (TM-011, JSR Co., Ltd.) cross-likable to an ultraviolet ray, 0.02 wt. % of a photopolymerization initiator (Irgacure 907, Ciba-Geigy) and 0.01 wt. % of a photosensitizer (Kayacure DETX, Nippon Kayaku Co., Ltd.) were dissolved. The obtained solution was used as a coating solution for an overcoating layer.

The coating solution was coated on the low refractive index layer prepared in Example 1 by using a wire bar of #3, dried at 60° C. for 1 minute, and irradiated with an ultraviolet lay for 1 minute by using a high pressure mercury lump of 12 W/cm to prepare an anti-reflection film. The coating amount of the overcoating layer was adjusted to 37 volume % of the micro voids of the low refractive index layer. The overcoating layer invades 25 volume % of the micro voids.

The obtained anti-reflection film was evaluated in the same manner as in Example 1. The results are set fourth in Table 2.

COMPARISON EXAMPLE 3

A silane fluoride coupling agent (KP-801M, Shinetsu Chemical Co., Ltd.) was dissolved in a fluorine solvent (Florinate FC-7, 3M) to prepare 0.15 wt. % solution. The obtained solution was used as a coating solution for an overcoating layer.

The coating solution was coated on the low refractive index layer prepared in Example 1 by using a wire bar of #3, and dried at 120° C. for 3 minutes to prepare an anti-reflection film. The coating amount of the overcoating layer was adjusted to 90 volume % of the micro voids of the low refractive index layer. The overcoating layer invades 94 volume % of the micro voids.

The obtained anti-reflection film was evaluated in the same manner as in Example 1. The results are set fourth in

TABLE 2

| No. | (0) | (1) | (2) | (3) | (4) | (5) | (6) | (7) |
|---|---|---|---|---|---|---|---|---|
| Ex. 3 | 6% | 0.34% | 1.40 | 110° | B | 2H | B | 0.33 |
| Ex. 4 | 25% | 0.40% | 1.42 | 104° | B | 3H | B | 0.28 |
| Ex. 5 | 25% | 0.38% | 1.42 | 103° | B | 3H | B | 0.23 |
| C3 | 90% | 0.82% | 1.47 | 109° | B | 2H | C | 0.30 |

(Remark)
C3: Comparison Example 3
(0) Ratio of overcoating layer invading micro voids
(1) Average reflectance
(2) Refractive index of low refractive index layer
(3) Surface contact angle
(4) Resistance to finger print mark
(5) Pencil hardness test
(6) Resistance to scratch
(7) Dynamic friction

EXAMPLE 6

A commercially available fluoropolymer (Cytop CTX-809, Asahi Glass Co., Ltd.) having the weight average molecular weight of 200,000 was dissolved in a fluorine solvent (Florinate FC-77, 3M) to prepare 1.5 wt. % solution. The obtained solution was used as a coating solution for an overcoating layer.

The coating solution was coated on the low refractive index layer prepared in Example 1 by using a wire bar of #3, and dried at 120° C. for 1 hour to prepare an anti-reflection film. The coating amount of the overcoating layer was adjusted to 120 volume % of the micro voids of the low refractive index layer. The overcoating layer invades 37 volume % of the micro voids.

The obtained anti-reflection film was evaluated in the same manner as in Example 1. The results are set fourth in Table 3.

EXAMPLE 7

Low molecular weight components were removed from the thermally cross-linkable fluoropolymer (JN-7124, JSR Co., Ltd.). The number average molecular weight of the obtained fluoropolymer was 50,000, and the weight average molecular weight was 70,000.

The obtained fluoropolymer was dissolved in methyl isobutyl ketone to prepare 1.0 wt. % solution. The obtained solution was used as a coating solution for an overcoating layer.

The coating solution was coated on the low refractive index layer prepared in Example 1 by using a wire bar of #3, and dried at 120° C. for 1 hour to prepare an anti-reflection film. The coating amount of the overcoating layer was adjusted to 120 volume % of the micro voids of the low refractive index layer. The overcoating layer invades 40 volume % of the micro voids.

The obtained anti-reflection film was evaluated in the same manner as in Example 1. The results are set fourth in Table 3.

EXAMPLE 8

The following fluoropolymer was synthesized.

(Fluoropolymer)

w:x:y:z=50:30:5:15, n:50

The number average molecular weight of the obtained fluoropolymer was 25,000, and the weight average molecular weight was 40,000.

The obtained fluoropolymer was dissolved in methyl isobutyl ketone to prepare 1.0 wt. % solution. The obtained solution was used as a coating solution for an overcoating layer.

The coating solution was coated on the low refractive index layer prepared in Example 1 by using a wire bar of #3, and dried at 120° C. for 1 hour to prepare an anti-reflection film. The coating amount of the overcoating layer was adjusted to 120 volume % of the micro voids of the low refractive index layer. The overcoating layer invades 48 volume % of the micro voids.

The obtained anti-reflection film was evaluated in the same manner as in Example 1. The results are set forth in Table 3.

EXAMPLE 9

Low molecular weight components were removed from the cross-linkable fluoropolymer (TM-001, JSR Co., Ltd.). The number average molecular weight of the obtained fluoropolymer was 60,000, and the weight average molecular weight was 80,000.

The obtained fluoropolymer was dissolved in methyl isobutyl ketone to prepare 1.0 wt. % solution. The obtained solution was used as a coating solution for an overcoating layer.

The coating solution was coated on the low refractive index layer prepared in Example 1 by using a wire bar of #3, dried at 120° C. for 1 minute, and irradiated with an ultraviolet lay for 1 minute by using a high pressure mercury lump of 12 W/cm to prepare an anti-reflection film. The coating amount of the overcoating layer was adjusted to 120 volume % of the micro voids of the low refractive index layer. The overcoating layer invades 37 volume % of the micro voids.

The obtained anti-reflection film was evaluated in the same manner as in Example 1. The results are set forth in Table 3.

COMPARISON EXAMPLE 4

A fluoropolymer was synthesized in the same manner as in Example 8, except that the reaction conditions were adjusted to decrease the molecular weight of the synthesized polymer. The number average molecular weight of the obtained fluoropolymer was 7,000, and the weight average molecular weight was 11,000.

The obtained fluoropolymer was dissolved in methyl isobutyl ketone to prepare 1.0 wt. % solution. The obtained solution was used as a coating solution for an overcoating layer.

The coating solution was coated on the low refractive index layer prepared in Example 1 by using a wire bar of #3, and dried at 120° C. for 1 hour to prepare an anti-reflection film. The coating amount of the overcoating layer was adjusted to 120 volume % of the micro voids of the low refractive index layer. The overcoating layer invades 95 volume % of the micro voids.

The obtained anti-reflection film was evaluated in the same manner as in Example 1. The results are set forth in Table 3.

TABLE 3

| No. | (0) | (1) | (2) | (3) | (4) | (5) | (6) | (7) |
|---|---|---|---|---|---|---|---|---|
| Ex. 6 | 37% | 0.43% | 1.44 | 110° | A | 3H | B | 0.30 |
| Ex. 7 | 40% | 0.42% | 1.44 | 104° | A | 3H | A | 0.12 |
| Ex. 8 | 48% | 0.48% | 1.45 | 98° | A | 3H | A | 0.22 |
| Ex. 9 | 37% | 0.37% | 1.44 | 107° | A | 3H | A | 0.20 |
| C4 | 95% | 0.84% | 1.47 | 98° | B | 3H | B | 0.25 |

(Remark)
C4: Comparison Example 4
(0) Ratio of overcoating layer invading micro voids
(1) Average reflectance
(2) Refractive index of low refractive index layer
(3) Surface contact angle
(4) Resistance to finger print mark
(5) Pencil hardness test
(6) Resistance to scratch
(7) Dynamic friction

What is claimed is:

1. An anti-reflection film comprising a transparent support and a low refractive index layer, a refractive index of said low refractive index layer being lower than a refractive index of the transparent support, and said low refractive index layer containing micro voids in an amount of 3 to 50 volume % of the low refractive index layer, wherein the anti-reflection film further has an overcoating layer provided on the low refractive index layer, said overcoating layer containing a fluorine compound, and wherein the fluorine compound is not present in the micro voids, or an amount of the fluorine compound present in the micro voids is less than 70 volume % of the micro voids.

2. The anti-reflection film as defined in claim 1, wherein the overcoating layer contains particles of the fluorine compound having an average particle size of not less than 10 nm.

3. The anti-reflection film as defined in claim 1, wherein an coating amount of the overcoating layer is less than 80 volume % of the micro voids of the low refractive index layer.

4. The anti-reflection film as defined in claim 1, wherein the fluorine compound is a fluoropolymer.

5. The anti-reflection film as defined in claim 4, wherein the fluoropolymer has a weight average molecular weight of not less than 20,000.

6. The anti-reflection film as defined in claim 4, wherein the fluoropolymer is cross-linked.

7. The anti-reflection film as defined in claim 6, wherein the fluoropolymer is cross-linked after the overcoating layer is formed.

8. The anti-reflection film as defined in claim 6, wherein the fluoropolymer is cross-linked by light irradiation.

9. The anti-reflection film as defined in claim 1, wherein the low refractive index layer contains particles, said particles being superposed upon each other to form micro voids surrounded by the particles.

10. The anti-reflection film as defined in claim 9, wherein the low refractive index layer further contains a binder polymer.

11. The anti-reflection film as defined in claim 1, wherein the anti-reflection film further has a high refractive index layer provided between the transparent support and the low refractive index layer, a refractive index of said high refractive index layer being higher than the refractive index of the transparent support.

12. The anti-reflection film as defined in claim 11, wherein the anti-reflection film further has a middle refractive index layer provided between the transparent support and the high refractive index layer, a refractive index of said middle refractive index layer being higher than the refractive index of the transparent support and being lower than the refractive index of the high refractive index layer.

13. A display device having a display surface covered with an anti-reflection film defined in claim 1.

* * * * *